Patented Jan. 21, 1941

2,229,368

UNITED STATES PATENT OFFICE 2,229,368

GREASE AND THE METHOD OF PREPARING THE SAME

Lawrence C. Brunstrum, Chicago, Ill., and Reuben A. Swenson, Whiting, Ind., assignors to Standard Oil Company, Chicago, Ill., a corporation of Indiana Application April 29, 1940, Serial No. 332,200

14 Claims. (Cl. 252—21)

This invention relates to improvements in lubricants and more particularly to improvements in greases for use under conditions of high temperature and pressure and to the method of preparing the same.

The compositions of the present invention are particularly adapted for lubricants such as mill greases, gear shields, skid greases and the like. Mill greases are used in lubricating large open bearings where high temperatures and shock loading are frequently encountered. Such greases are usually employed for the lubrication of bearings on steel calender rolls and other rolls in paper mills, tube and hammer mills for pulverizing cement, coal, ores and the like. Mill greases are also frequently used to lubricate heavy open shafting subjected to high temperatures. Gear shields are heavy gear lubricants used to lubricate large open pinions and spray cooled worm drives generally used in steel rolling mills and the like. Skid greases are lubricants employed to lubricate the skids forming the hot beds in rail mills and the like.

It is an object of the present invention to provide a lubricant having a high softening time for the soap content thereof.

Another object of the invention is to provide a lubricant which can be molded into cohesive tough blocks capable of withstanding shock loading.

A further object is to provide a grease cake which is oily and unctuous when rubbed or worked and which is capable of being worked without a material change in consistency.

Another object of the present invention is to provide a grease which is highly resistant to high temperatures, which does not leak oil at high temperatures and which does not carbonize.

Still another object of the invention is to provide a grease which will stick tenaciously to open gears at high temperatures.

Figure 1:
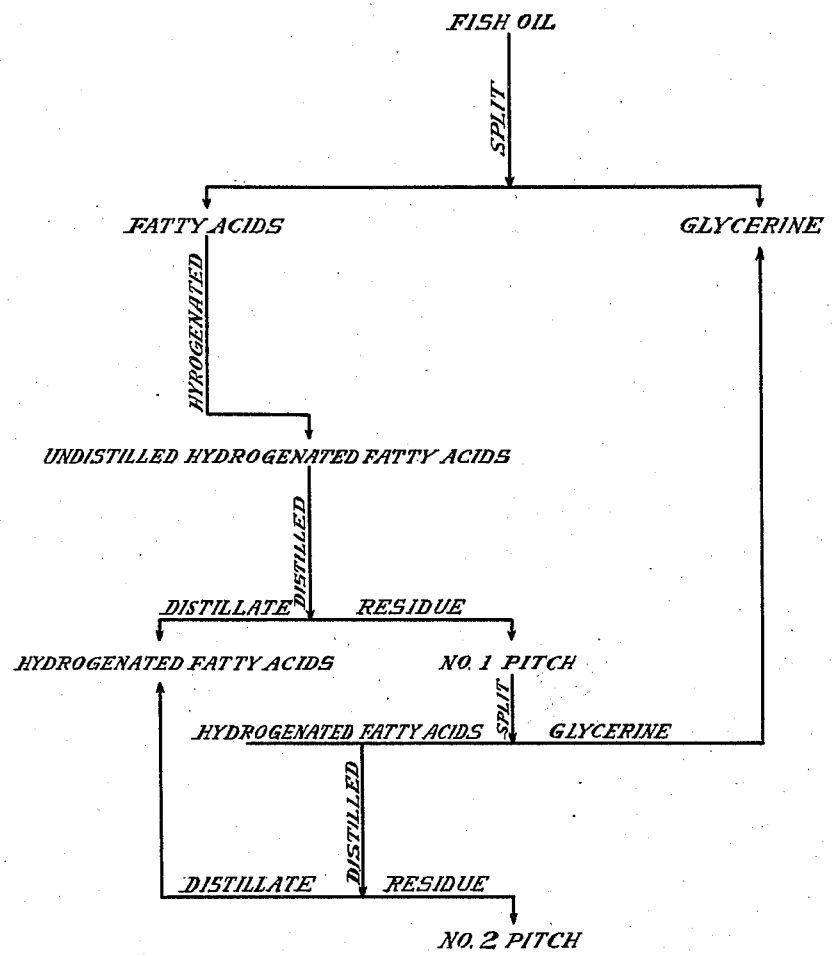
Figure 2:
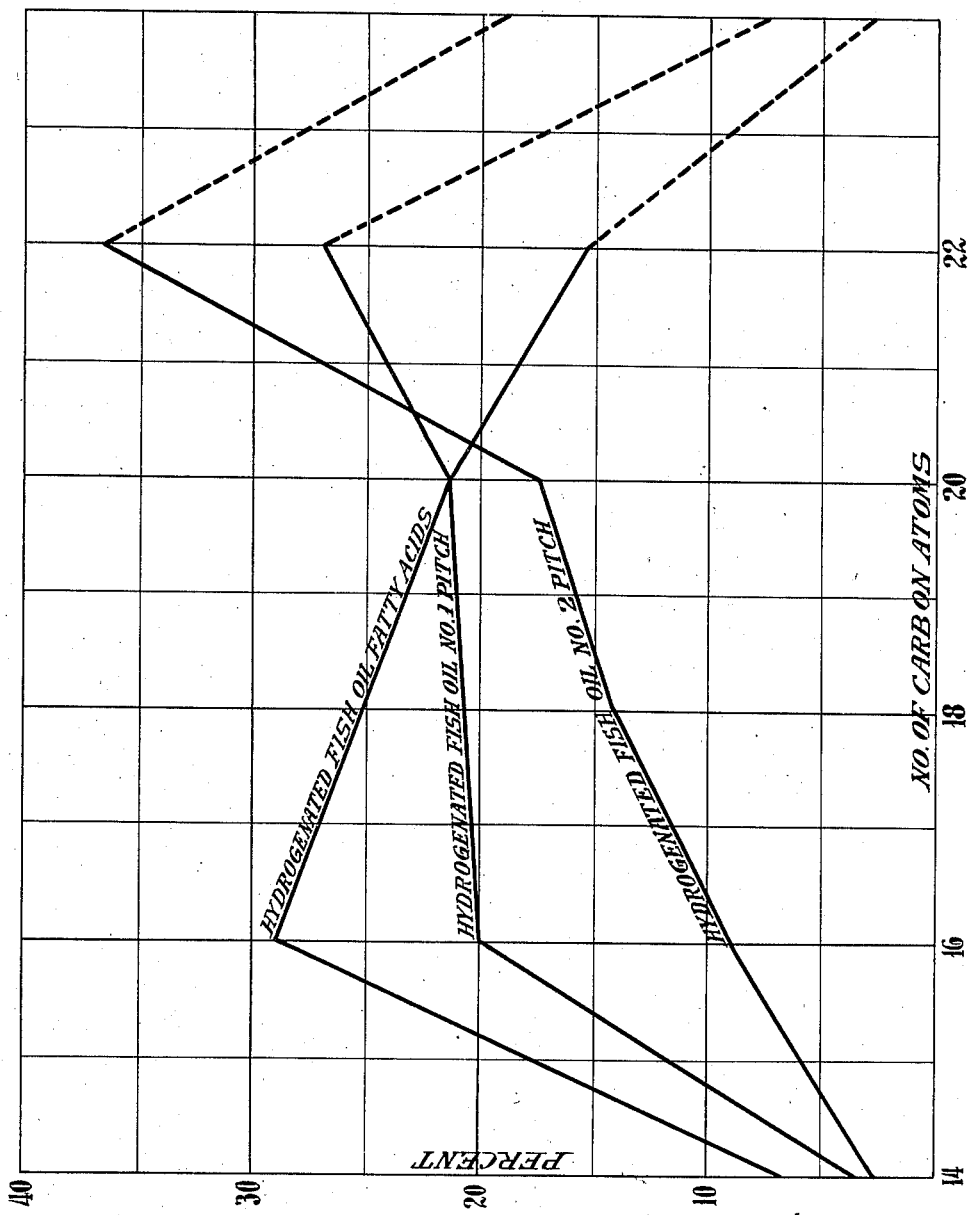

Other objects and advantages of the present invention will become apparent from the following description thereof, and the accompanying drawings which form a part of this specification, and in which Figure 1 is a flow diagram showing the source of the essential ingredient of our greases, and Figure 2 is a chart showing the fatty acid composition of this material.

We have discovered that a lubricant having the above stated desirable properties can be obtained by preparing a grease in which the fatty materials usually employed for forming the soap portion of the grease is replaced by the pitch obtained from the distillation of hydrogenated fish oils. The source of this material is shown by the flow diagram of Figure 1 accompanying this specification. The fish oil which may be used, for example sardine oil, herring, cod, menhaden and the like, is first split by any of the well known methods to produce glycerine and fatty acids. After separation of the glycerine the fatty acids are hydrogenated and the hydrogenated fatty acids subsequently distilled to produce an overhead distillate of hydrogenated fish oil fatty acids and a residue referred to herein as No. 1 pitch. The No. 1 pitch in which are concentrated some fatty materials may be used as such for our purposes. However, it is preferred to submit the No. 1 pitch to a splitting operation to produce more glycerine and hydrogenated fatty acids. After separation of the glycerine the hydrogenated fatty acids are distilled to produce an overhead product of hydrogenated fish oil fatty acids which may be combined with the distillate from the first distillation. The residue resulting from the second distillation is the material we prefer to use and is referred to herein as No. 2 pitch.

These pitches although commonly referred to as stearine pitch are not to be confused with the tarry, fatty acid pitches obtained by the distillation of animal or vegetable fatty materials. The pitch obtained as a residue in the distillation of hydrogenated fish oils is distinguished from the so-called stearine pitches from animal and vegetable fatty materials in that the latter are unsaturated, relatively high in unsaponifiable matter, and deficient in fatty acids above $C_{18}$. In contrast the pitches obtained from distillation of hydrogenated fish oils are saturated, rich in $C_{20}$, $C_{22}$, $C_{24}$ and higher molecular weight fatty acids, and are relatively poor in unsaponifiable matter. These pitches contain at least 65% of $C_{20}$ to $C_{24}$ and higher fatty acids. Stearine pitches obtained in the distillation of vegetable and animal fats are a dark, tarry material whereas the pitches obtained from the distillation of hydrogenated fish oil are crystalline in structure and are of a relatively light color.

The inspections on representative samples of No. 1 pitch and No. 2 pitch are given in Table I below.

TABLE I

Constants on stearine pitch

|  | No. 1 pitch |  | No. 2 pitch |  |
|---|---|---|---|---|
| Saponification No., mgm. KOH/gm | | | 151 | 152.6 |
| Free fatty acid (oleic), percent | 16.6 | 18.4 | 10.5 | 15.3 |
| Total fatty acid, percent | 93 | | 86.5 | 86.3 |
| Fat, percent | 79.7 | 79.7 | 79.3 | 74.2 |
| Neutralization No. (acids) mgm. KOH/gm | | | 178 | 177 |
| Moisture-insoluble-unsaponifiable, percent | 4.3 | 3.9 | 10.4 | 11.8 |
| Iodine value (Hanus) | 4.2 | 5.6 | | |
| Melting point, °F | 58.8 | 75.6 | 59.0 | 78.0 |

As indicated in the above table the No. 1 pitch has a very low moisture-insoluble-unsaponifiable content and an extremely low iodine value. This pitch as indicated by its low iodine value is as saturated as double pressed stearic acid. The high total fatty acid content of these pitches as compared to the fatty acid content of not substantially more than about 10% for the so-called stearine pitches from animal and vegetable fats makes the former valuable as a soap stock for grease making.

The composition of the No. 1 and No. 2 pitches and the composition of the distilled hydrogenated fish oil fatty acids is given in Table No. 2.

TABLE II

*Composition of fatty acids*

|  | No. 1 pitch | No. 2 pitch | Distilled hydrogenated fish oil fatty acids |
|---|---|---|---|
| $C_{14}$ | 4.9 | 3.5 | 2.5 | 6.7 |
| $C_{16}$ | 21.7 | 20.0 | 9.2 | 28.8 |
| $C_{18}$ | 17.8 | 20.8 | 14.2 | 25.1 |
| $C_{20}$ | 22.7 | 21.1 | 17.6 | 21.1 |
| $C_{22}$ | 24.1 | 27.1 | 37.7 | 15.4 |
| $C_{24}$ and unidentified | 8.8 | 7.5 | 18.8 | 2.9 |

The data of Table II are graphically represented in Figure 2 accompanying the specification. As noted from the above data the No. 1 pitch and the No. 2 pitch are rich in $C_{20}$ to $C_{22}$ fatty acids.

Broadly our invention comprises greases in which the soap base is prepared by saponifying pitch obtained from the distillation of hydrogenated fish oils with caustic soda. Greases of the hereinbefore stated types in general are prepared from soda soaps and soda rosin soaps and may, if desired, contain a filler such as asbestos mica, graphite, talc and the like.

These greases have the following approximate composition by weight percent:

| | Per cent |
|---|---|
| Soda soap of hydrogenated fish oil fatty acid pitch | 1.0 to 30.0 |
| Soda rosin soap | 1.0 to 30.0 |
| Oil | 30.0 to 98.0 |
| Filler | 0.0 to 30.0 |

The ratio of soda rosin soap to the soda pitch soap may be varied respectively from about 1:10 to 10:1.

Our invention may be understood from the following examples which are given by way of illustration and are not to be construed as limiting the scope of the invention.

EXAMPLE I

A mill grease made from the following ingredients in the following approximate proportions:

| | Pounds |
|---|---|
| Hydrogenated fish oil fatty acid No. 2 pitch | 15.6 |
| "Rosin-oil" | 25.7 |
| Dry sodium hydroxide | 3.57 |
| Mineral oil | 55.93 | is prepared by charging into a mixer the No. 2 pitch and an amount of mineral oil equal to one and one-half times the amount of pitch by weight. The oil and pitch are heated to a temperature about 170° F. to 270° F. until the pitch is completely melted and all of the required sodium hydroxide in a 48° Baumé solution then added. Two-thirds of the required "rosin-oil" is then added and the mixture heated to a temperature of about 220° F. to 250° F. until substantially all of the water is driven out, and the temperature then raised to about 320° to 350° F. The mixture is maintained at this temperature for about one hour or longer until foaming ceases and the remaining portion of the "rosin-oil" added. The mixture is maintained at a temperature of about 320° F. to about 350° F. for about two hours during which period the alkalinity of the base is adjusted to 0.05% to 0.1% sodium hydroxide. The balance of the required amount of mineral oil is then graded in and the temperature raised to about 400° F. to 425° F. and maintained at this temperature for about 15 minutes. The grease is then filled into water cooled pans to solidify the grease. After the grease has solidified it is then cut into cakes of the desired size.

The term "rosin-oil" identifies throughout the specification and claims a composition used in preparing the above grease, as well as the greases hereinafter described, and is a mixture of about 50% rosin acid and about 50% mineral oil.

The above grease has the following approximate composition:

| | Per cent by weight |
|---|---|
| Soda soap of hydrogenated fish oil fatty acid pitch | 14.04 |
| Soda rosin soap | 13.62 |
| Oil | 72.34 |

Although the total soap content of the above grease is about 27% and the ratio of the soda rosin soap to the soda soap of No. 2 pitch is about 1:1 this ratio may be varied from 1:10 parts of the soda rosin soap to 10:1 parts of the soda soap of No. 2 pitch, and the soap content may be varied from about 10% to about 50% to obtain products having varying, desired consistencies.

Greases having the above composition and prepared in the manner described having an exceptionally high softening time for their soap content and consistency. The grease cake is oily and unctuous when rubbed or worked and its consistency is not materially affected when worked. The finished grease cake is smooth, cohesive and tough and is capable of withstanding shock loading. This grease is extremely resistant to high temperatures and is not susceptible to leakage even when maintained at high temperatures for long periods of time.

EXAMPLE 2

A grease suitable for use as a heavy gear shield lubricant is prepared using soda pitch soap in place of the soda fatty acid soap usually employed in preparing such greases. This grease is made from the following ingredients in the following approximate proportions:

| | Pounds |
|---|---|
| Hydrogenated fish oil fatty acid No. 2 pitch | 2.6 |
| "Rosin-oil" | 4.0 |
| Dry sodium hydroxide | .54 |
| Air floated asbestos | 25.0 |
| Petroleum oil | 67.98 |

This grease will have the following approximate composition:

| | Per cent by weight |
|---|---|
| Soda soap of hydrogenated fish oil fatty acid pitch | 2.34 |
| Soda rosin soap | 2.12 |
| Air floated asbestos | 25.00 |
| Oil | 70.54 |

In the preparation of this grease all of the No. 2 pitch in an amount of oil equivalent to two and one-half times the amount of pitch is charged to a mixer and the contents heated until the pitch is completely melted. All of the sodium hydroxide in a 48° Baumé solution is then added at a temperature of about 150° F. to about 200° F. The temperature is then raised to about 235° to 250° F. and maintained at this temperature for about 3 hours until saponification is completed. During this period small amounts of water are added intermittently. After the 3 hour saponification period more heat is applied to the mixer and substantially all of the water driven out of the soda soap base. All of the "rosin-oil" is then slowly added and heating continued until the soap base is again dry. At this point the alkalinity of the mix is adjusted to 0.03% to about 0.1% sodium hydroxide and about one-half of the balance of the oil graded in. After this portion of the oil has been graded in the asbestos is added and stirring continued until the batch is smooth. After all of the asbestos has been added the balance of the oil is graded in and the batch stirred at a temperature of about 200° F. to about 225° F. The batch is then ready for filling.

As shown above the total soap content of the grease is about 4% and the ratio of soda rosin soap to the soda pitch soap is about 1:1. However, the soap content may be varied from about 1% to about 30% to obtain greases of this type having various consistencies, and the ratio of the soda rosin soap to the soda pitch soap may be varied in the ratio of from about 1:10 parts of soda rosin soap to 10:1 parts respectively of the soda pitch soap. While the oil used in the above example has a Saybolt Universal viscosity at 210° F. at about 125 seconds, oil ranging in viscosities from 50 seconds to 400 seconds at 210° F. Saybolt Universal may be used.

Greases of this type possess unusual heat resistant properties and adhere well to gear teeth even at high temperatures.

EXAMPLE 3

A skid grease having a consistency that permits it to be applied to the skids by means of a mechanical dispensing system and having the following approximate composition:

| | Per cent by weight |
|---|---|
| Soda soap of hydrogenated fish oil fatty acid pitch | 1.59 |
| Soda rosin soap | 1.63 |
| Asbestos | 23.50 |
| Oil | 73.18 | is prepared using the following formula:

| | Pounds |
|---|---|
| Hydrogenated fish oil fatty acid No. 2 pitch | 1.88 |
| "Rosin-oil" | 3.08 |
| Dry sodium hydroxide | 0.4 |
| Asbestos | 23.5 |
| Petroleum oil | 71.53 |

The grease is prepared in substantially the same manner as was the gear shield lubricant described in Example 2. While the total soap content of the finished grease is about 3.0% and the ratio of soda rosin soap to the soda pitch soap is 1:1, the soap content may be varied from 0.1%, which content produces an appreciable thickening effect of the oil, to such a soap percentage that the grease is no longer dispensable by mechanical dispensing equipment. The ratio of soda rosin soap to the soda pitch soap may also be varied in order to obtain greases of various properties. Thus the ratio of the soda rosin soap to the soda pitch soap may be varied from 1:10 parts to 10:1 parts respectively. The oil used in preparing a grease of the above formula is one having a Saybolt Universal viscosity at 100° F. of about 900 seconds. However, the oil viscosity may be varied from a Saybolt Universal viscosity at 100° F. of about 80 seconds to a Saybolt Universal viscosity at 210° F. of about 300 seconds. This skid grease is a smooth buttery grease which spreads well when contacted by the hot rail or billet. It is highly heat resistant and does not flow when subjected to high temperatures and is sufficiently non-inflammable so that it does not flash when contacted by rails or billets that are at red heat.

Wherever used in the specification and claims the term "pitch" refers to the pitch obtained by the distillation of hydrogenated fish oil fatty acids and the term "soda pitch soap" refers to the sodium soap of the hydrogenated fish oil fatty acid pitch.

While the present invention has been described and illustrated with respect to preferred embodiments thereof the same are not to be considered as limiting the scope of the invention except insofar as defined by the appended claims.

We claim:

1. A heat resistant grease comprising a lubricating oil, soda rosin soap and soda soap of hydrogenated fish oil fatty acid pitch.

2. A heat resistant grease comprising a lubricating oil, soda rosin soap, a filler and soda soap of hydrogenated fish oil fatty acid pitch.

3. A heat resistant grease comprising from about 1.0% to about 30.0% of soda rosin soap and from about 1.0% to about 30.0% soda soap of hydrogenated fish oil fatty acid pitch and a lubricating oil.

4. A heat resistant grease comprising a lubricating oil soda rosin soap and soda soap of hydrogenated fish oil fatty acid pitch in which the ratio of soda rosin soap to soda hydrogenated fish oil pitch soap varies from about 1:10 to about 10:1 respectively.

5. A grease resistant to high temperatures comprising the following approximate composition:

| | Per cent |
|---|---|
| Soda soap of hydrogenated fish oil fatty acid pitch | 1.0 to 30 |
| Soda rosin soap | 1.0 to 30 |
| Oil | 30.0 to 98 |
| Filler | 0.0 to 30 |

6. A heavy gear shield lubricant resistant to high temperatures comprising a soda soap of hydrogenated fish oil fatty acid pitch, soda rosin soap, asbestos and a lubricating oil, the total soap content of said grease ranging from about 1.0% to about 30.0% and the ratio of the soda rosin soap to the soda soap of hydrogenated fish oil fatty acid pitch varying in the ratio of from about 1:10 to 10:1 respectively.

7. A heavy gear shield lubricant resistant to high temperatures comprising the following approximate composition:

| | Per cent by weight |
|---|---|
| Soda soap of hydrogenated fish oil fatty acid pitch | 2.34 |
| Soda rosin soap | 2.12 |
| Air floated asbestos | 25.00 |
| Petroleum oil | 70.54 |

8. A mill grease comprising a lubricating oil, soda rosin soap and soda soap of hydrogenated fish oil fatty acid pitch in which the total soap content varies from about 10% to about 50% and the ratio of the soda rosin soap to the soda soap of the hydrogenated fish oil fatty acid pitch varies from about 1:10 to about 10:1 respectively.

9. A mill grease having the following approximate composition:

| | Per cent by weight |
|---|---|
| Soda soap of hydrogenated fish oil fatty acid pitch | 14.04 |
| Soda rosin soap | 13.62 |
| Mineral oil | 72.34 |

10. A skid grease resistant to high temperatures and capable of being mechanically dispensed comprising the following approximate composition:

| | Per cent by weight |
|---|---|
| Soda soap of hydrogenated fish oil fatty acid pitch | 1.59 |
| Soda rosin soap | 1.63 |
| Asbestos | 23.50 |
| Petroleum oil | 73.18 |

11. A method of preparing a heat resistant heavy gear shield lubricant prepared from the following ingredients in the following approximate proportions:

| | Pounds |
|---|---|
| Hydrogenated fish oil fatty acid pitch | 2.60 |
| "Rosin-oil" | 4.00 |
| Dry sodium hydroxide | .54 |
| Air floated asbestos | 25.00 |
| Petroleum oil | 67.98 | comprising mixing all of the hydrogenated fish oil fatty acid pitch in an amount of oil equivalent to about two and one-half times the amount of pitch, heating the mixture until all the pitch is completely melted, adding all of the sodium hydroxide in a 48° Baumé solution to said mixture at a temperature to about 150° F. to about 200° F., raising the temperature to about 235° F. to about 250° F. and maintaining the mixture at this temperature for about three hours until saponification is completed, adding small amounts of water to said mixture during said saponification period, increasing the temperature after saponification of the hydrogenated fish oil fatty acid pitch to remove substantially all of the water, adding all of the "rosin-oil" to the mixture and heating the same until dry, adjusting the alkalinity of the mixture to about 0.03% to about 0.1% sodium hydroxide, grading in about one-half the balance of the oil and all of the asbestos, stirring the mixture until smooth and finally grading in the remaining portion of the oil at a temperature of about 200° F. to about 225° F.

12. A method of preparing a heat resistant mill grease prepared from the following ingredients in the following approximate proportions:

| | Pounds |
|---|---|
| Hydrogenated fish oil fatty acid pitch | 15.6 |
| "Rosin-oil" | 25.7 |
| Dry sodium hydroxide | 3.57 |
| Mineral oil | 55.93 | comprising mixing all of the pitch and an amount of mineral oil equal to about one and one-half times the amount of pitch at a temperature of about 170° F. to about 270° F. until the pitch is completely melted, adding all of the sodium hydroxide in a 48° Baumé solution, adding to said mixture two-thirds of the required "rosin-oil" and heating the mixture to a temperature of about 220° F. to about 250° F. until substantially all of the water is driven out, raising the temperature to about 320° F. to about 350° F. and maintaining the same at this temperature until foaming ceases and then adding the remaining portion of the "rosin-oil," maintaining the temperature at about 320° F. to about 350° F. for about two hours while adjusting the alkalinity of the mixture to about 0.05% to about 0.1% sodium hydroxide, grading in the balance of the mineral oil, raising the mixture to a temperature of about 400° F. to about 425° F. and maintaining the same at said temperature for about 15 minutes and subsequently filling the mixture into water-cooled pans to solidify the grease.

13. The method of preparing a heat resistant grease comprising the following ingredients:

Hydrogenated fish oil fatty acid pitch
"Rosin-oil"
Mineral oil, and
Sodium hydroxide comprising mixing all of the hydrogenated fish oil fatty acid pitch with an amount of mineral oil equivalent to from about one and one-half times to about two and one-half times the amount of pitch, heating the mixture to a temperature sufficient to melt all of the pitch, adding all of the sodium hydroxide in a 48° Baumé solution, raising the temperature of the mixture to about 235° F. to 250° F., adding the "rosin-oil," adjusting the alkalinity of the mixture to about 0.05% to about 0.1% sodium hydroxide and subsequently grading in the balance of the mineral oil.

14. A grease comprising a lubricating oil, soda rosin soap, and a soda soap of hydrogenated fish oil fatty acid pitch.

LAWRENCE C. BRUNSTRUM.
REUBEN A. SWENSON.